(12) United States Patent
Allert et al.

(10) Patent No.: US 8,403,606 B2
(45) Date of Patent: Mar. 26, 2013

(54) ADJUSTMENT DEVICE FOR THE ALIGNMENT OF SUPPORTING PARTS ON STRUCTURES HAVING INHERENT DIMENSIONAL TOLERANCES

(75) Inventors: Torben Allert, Bremen (DE); Jens Krüger, Schönebeck (DE)

(73) Assignee: Airbus Deutschland GmbH, Hamburg (DE)

( * ) Notice: Subject to any disclaimer, the term of this patent is extended or adjusted under 35 U.S.C. 154(b) by 841 days.

(21) Appl. No.: 11/906,018

(22) Filed: Sep. 28, 2007

(65) Prior Publication Data

US 2008/0089756 A1 Apr. 17, 2008

(30) Foreign Application Priority Data

Oct. 13, 2006 (DE) .......................... 10 2006 049 075

(51) Int. Cl.
*B60P 7/08* (2006.01)
(52) U.S. Cl. ............................................ 410/80; 410/77
(58) Field of Classification Search .................... 410/46, 410/66, 67, 77, 80, 94, 95; 244/118.1, 137.1
See application file for complete search history.

(56) References Cited

U.S. PATENT DOCUMENTS

| | | | | |
|---|---|---|---|---|
| 2,887,070 A * | 5/1959 | Terlecky et al. | ................. | 410/94 |
| 3,092,043 A | 6/1963 | Tobin | | |
| 3,125,035 A * | 3/1964 | Loomis | ............................ | 410/80 |
| 3,878,806 A | 4/1975 | Garcia | | |
| 3,966,075 A * | 6/1976 | Schultz | ........................... | 220/1.5 |
| 4,753,615 A | 6/1988 | Weidler et al. | | |
| 5,013,197 A * | 5/1991 | Allaert et al. | ................... | 410/77 |
| 5,230,485 A | 7/1993 | Vogg et al. | | |
| 5,234,297 A | 8/1993 | Wieck et al. | | |
| 5,308,202 A * | 5/1994 | Tatina | ............................. | 410/94 |
| 5,597,084 A | 1/1997 | Parasin | | |
| 5,846,042 A * | 12/1998 | Iannuzzi | ........................ | 411/120 |
| 6,000,888 A * | 12/1999 | Hartman | ................... | 408/239 R |
| 6,530,674 B2 | 3/2003 | Grierson et al. | | |
| 6,578,902 B2 | 6/2003 | Sill | | |
| 7,086,815 B2 | 8/2006 | Bruns | | |
| 7,100,299 B2 | 9/2006 | Jensen et al. | | |
| 7,201,550 B2 | 4/2007 | Borrmann et al. | | |
| 7,214,015 B2 | 5/2007 | Bruns | | |
| 7,406,777 B2 | 8/2008 | Grover et al. | | |
| 7,469,478 B2 | 12/2008 | Mitterreiter | | |
| 2002/0180238 A1 | 12/2002 | Sill | | |
| 2004/0265087 A1 | 12/2004 | Bruns | | |
| 2008/0083849 A1* | 4/2008 | Allert et al. | ................ | 244/118.2 |
| 2008/0089756 A1 | 4/2008 | Allert et al. | | |
| 2009/0229105 A1 | 9/2009 | Schubetzer | | |

OTHER PUBLICATIONS

U.S. Appl. No. 11/906,019, filed Sep. 28, 2007.
U.S. Appl. No. 11/906,012, filed Sep. 28, 2007.

* cited by examiner

*Primary Examiner* — Stephen Gordon
(74) *Attorney, Agent, or Firm* — Collard & Roe, P.C.

(57) ABSTRACT

An adjustment device aligns supporting parts that receive the guide rails of a freight loading system for structures having inherent dimensional tolerances, in particular for receiving structures in an aircraft fuselage. Each supporting part is designed as a bearing insert held with an adjustable movement in a bearing eye of a bearing block, and in that the bearing block has at least two tensioning elements that bear on the bearing insert.

8 Claims, 2 Drawing Sheets

ADJUSTMENT DEVICE FOR THE ALIGNMENT OF SUPPORTING PARTS ON STRUCTURES HAVING INHERENT DIMENSIONAL TOLERANCES

CROSS REFERENCE TO RELATED APPLICATIONS

Applicants claim priority under 35 U.S.C.§119 of German Application No. 10 2006 049 075.4 filed Oct. 13, 2006.

BACKGROUND OF THE INVENTION

1. Field of the Invention

The invention concerns an adjustment device for the alignment of supporting parts that pivotally accommodates the guide rails of a freight loading system on structures having inherent dimensional tolerances, such as an aircraft fuselage.

2. The Prior Art

Containers or pallets are guided and secured in predetermined tracks with guide rails. Depending on the kind of freight to be accommodated in the freight loading system, such kinds of guide rails are sometimes not necessary and then often represent a source of disruption. Therefore, it is known art to create a plane freight loading surface by folding the guide rails down, or in, as necessary. To be able to implement folding movements of the guide rails of this kind, the supporting parts must be aligned with each other with a specification of tight dimensional tolerances. To ensure a reliable and enduring alignment of the supporting parts within freight loading systems subjected to vibration, the attachment of the supporting parts to the structures having inherent dimensional tolerances takes place by form or material connections. However, these have the disadvantage that adjustment tasks as well as any later fine alignments on the supporting parts are either not possible at all, or are only possible with a large amount of effort.

SUMMARY OF THE INVENTION

The object of the invention is to identify an adjustment device with which adjustment and alignment tasks on the supporting parts are simplified.

This object is achieved according to the invention with an adjustment device for the alignment of supporting parts pivotally accommodating the guide rails of a freight loading system on structures having inherent dimensional tolerances such as an aircraft fuselage. Each supporting part is designed as a bearing insert held with an adjustable movement in a bearing eye of a bearing block. The bearing block has at least two tensioning elements that bear on the bearing insert. Advantageous further embodiments of the invention are discussed below.

The adjustment device according to the invention is distinguished in that each supporting part is designed as a bearing insert held with an adjustable movement in a bearing eye of a bearing block. The bearing block has at least two tensioning elements that bear on the bearing insert. For the alignment of the bearing insert within the bearing eye, the bearing insert is moved into its optimum position with one of the two tensioning elements. With the other tensioning element, an initial tension is built up between the two tensioning elements in each case. Via the initial tension, self-securing friction coefficients are built up between the tensioning elements and the bearing block, such that the bearing insert is securely held in its desired position. Thus for the alignment of the supporting parts, just the tensioning elements need to be adjusted, and the adjustment and alignment tasks on the supporting parts are essentially simplified. The position of the bearing block on the structures having inherent dimensional tolerances does not need to be altered.

According to a first further development of the invention, each tensioning element has a threaded shaft, and the bearing block has at least two threaded holes, assigned to each threaded shaft. Threads have the advantage that they enable a continuous adjustment of the tensioning elements within the bearing block, and thus also of the bearing insert within the bearing eye. Moreover, threads represent a particularly simple option in design terms for the tensioning of the tensioning elements against each other.

According to a next further development of the invention, each tensioning element features rotary movement and is composed of a threaded part having the threaded shaft and a clamping part in engagement with the bearing insert. If the longitudinal axis of the threaded shaft is aligned approximately at right angles to the direction of adjustment of the bearing insert, the related clamping part has clamping surfaces that are inclined or tapered, but preferably are curved in a concave manner. If the longitudinal axis of the threaded shaft is aligned approximately in the direction of adjustment of the bearing insert, the clamping part has clamping surfaces abutting frontally against the bearing insert. With the present invention, the tensioning elements have threaded shafts and/or threaded parts of different design. The constructional design of the clamping surfaces present on the clamping part depends on the arrangement of the tensioning element in the bearing block and also on the adjustment movement of the bearing insert within the bearing block.

Alternatively, at least one of the tensioning elements is designed as a spring acting against the one or more other tensioning elements in each case. A tensioning element designed as a spring has the advantage that it adapts automatically to the position of the other tensioning element in each case. For this purpose, the spring is designed such that its spring force is greater than that of the maximum bearing forces to be accommodated by the bearing insert. Only the adjustment forces that can be generated with an adjustment movement force the spring into a deflection movement. With the tensioning element designed as a spring, the adjustment and alignment tasks to be undertaken on the supporting parts are further simplified.

In a design of the clamping parts with clamping surfaces that are inclined or tapered, or curved in a concave manner, the bearing insert is designed as an axisymmetric bushing with a centrally arranged axis seating. In principle the bearing insert can, however, also have other shapes, wherein further adjustment and alignment possibilities of the device ensue, in particular, with an eccentric arrangement of the axis seating.

In order to be able to embody the tensioning elements constructionally in a particularly simple manner, the bearing eye has guide surfaces that interact with the bearing insert. With the guide surfaces the possible adjustment movements of the bearing insert are limited to particular directions. Depending on the design of the clamping parts that bear on the bearing inserts, the guide surfaces of the bearing eye can also function as clamping surfaces, which then interact with the clamping surfaces designed on the clamping parts.

According to a particularly preferred further development of the invention, the bearing eye is designed as an elongated hole, whose hole flanks form the guide surfaces. The elongated hole represents a slotted guide, in which the bearing insert is guided in the manner of a slider block. In this manner, the adjustable movement of the bearing insert within the bearing eye is limited to two guide directions that are opposed to one another, and a tensioning element is assigned to each guide direction. The bearing eye designed as an elongated hole in its bearing block preferably has a vertical alignment. In principle it is, however, also conceivable that the bearing eye designed as an elongated hole is aligned in a horizontal or inclined position.

The invention also relates to an aircraft that makes use of the adjustment device according to the invention.

BRIEF DESCRIPTION OF THE DRAWINGS

Other objects and features of the present inventions will become apparent from the following detailed description considered in connection with the accompanying drawings. It is to be understood, however, that the drawings are designed as an illustration only and not as a definition of the limits of the inventions.

In the drawings, wherein similar reference characters denote similar elements throughout the several views.

DETAILED DESCRIPTION OF THE PREFERRED EMBODIMENT

Figure 1:
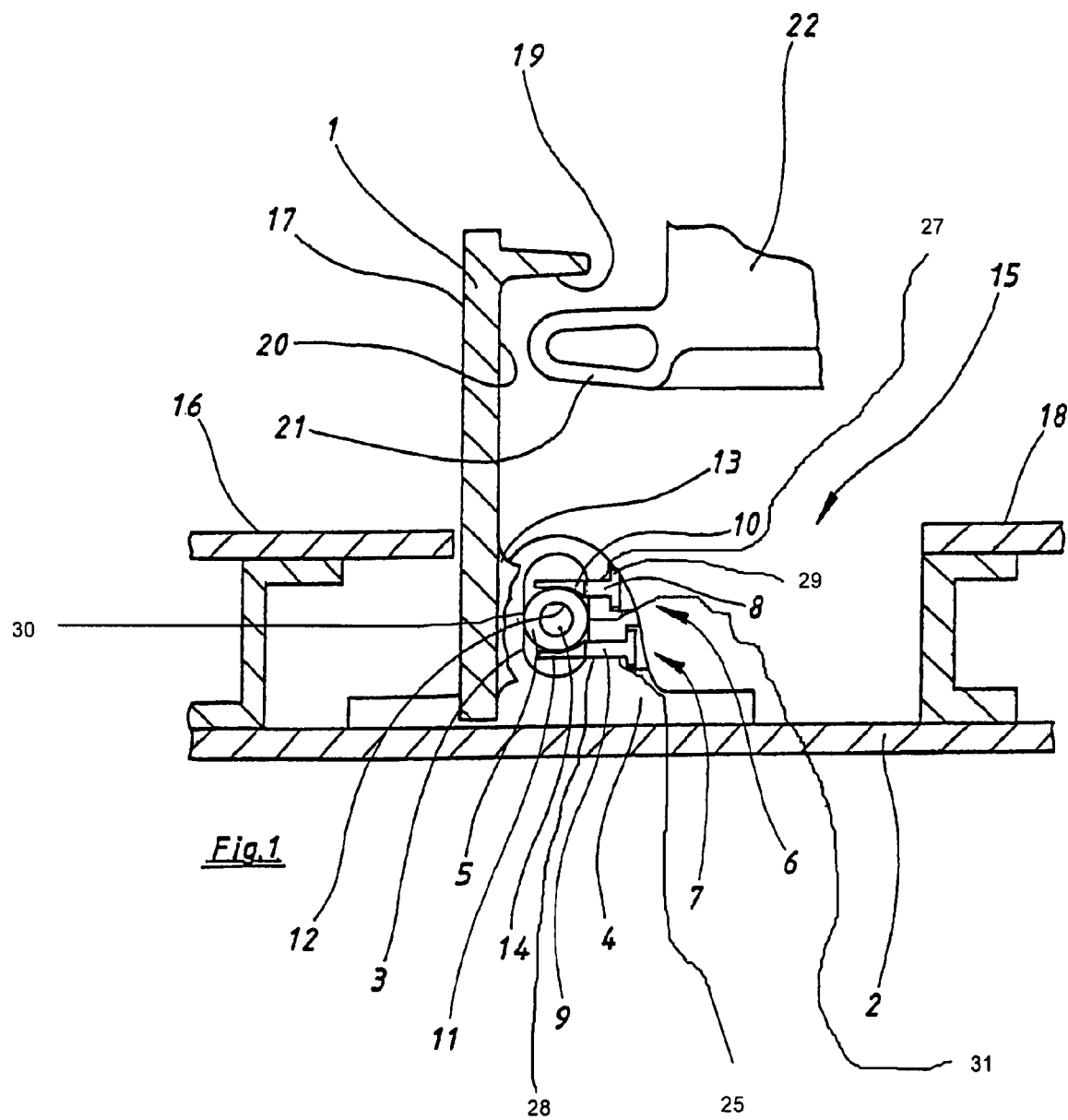
FIG. 1 shows a side view of the adjustment device according to the invention in a first embodiment.

FIG. 1 shows a side view of the adjustment device according to the invention in a first embodiment. The adjustment device serves for the alignment of a supporting part pivotally accommodating the guide rails 1 of a freight loading system on structures 2 having inherent dimensional tolerances. The supporting part is designed as a bearing insert 5 held with an adjustable movement in a bearing eye 3 of a bearing block 4. The bearing block 4 has two tensioning elements 6, 7 that bear on bearing insert 5. Each tensile element 6, 7 has a threaded shaft 25, 27, and bearing block 4 has two threaded holes 28, 29, that engage with a threaded shaft 25, 27, in a form fit. Tensioning elements 6, 7 each feature rotary movement and are composed of a threaded part 8, 9 having threaded shaft 25, 27, and a clamping part 10, 11 in engagement with bearing insert 5. Bearing insert 5 is designed as an axisymmetric bushing, which has a centrally arranged axis seating 12. Bearing eye 3 is designed as an elongated hole, whose hole flanks 30, 31, are designed as guide surfaces that interact with the bearing insert 5. Guide rails 1 have joint plates 13, whose bearing eyes 3 are connected via a bearing bolt 14 by means of a pivot joint with bearing block 4 such that guide rail 1 can be snapped into the space 15 and a plane freight loading surface is produced from the surface sections 16, 17, 18. Guide rails 1 have guide surfaces 19, 20 for the guidance and securing of a runner 21 of a container 22.

Figure 2:
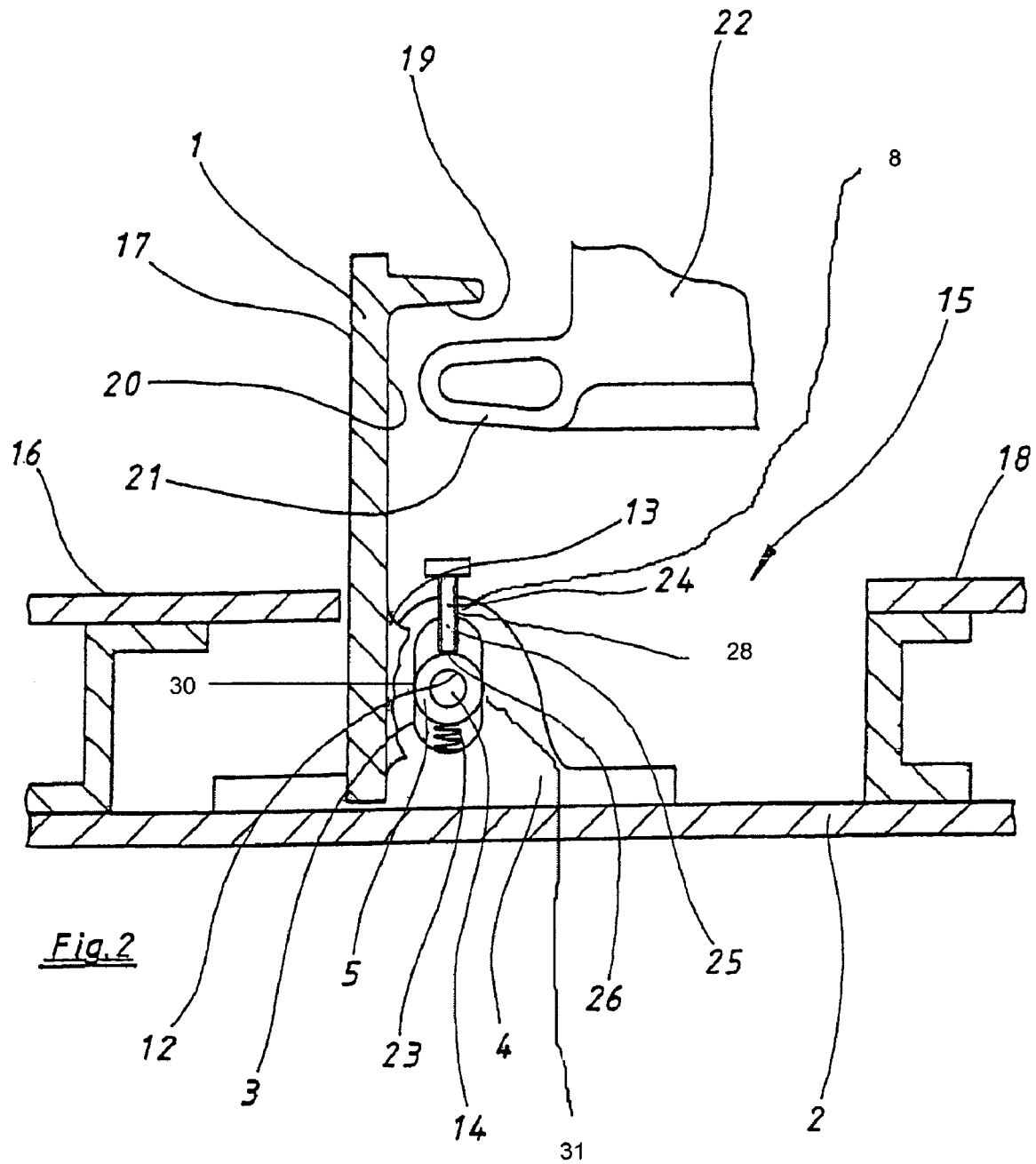
FIG. 2 shows a side view of the adjustment device according to the invention in a second embodiment.

FIG. 2 shows a side view of the adjustment device according to the invention in a second, in which a tensioning element 23 designed as a spring and a tensioning element 24 are braced against one another. Tensioning element 24 is designed in one piece, and has a threaded shaft 25 in engagement with bearing block 4 in a form fit and also a clamping surface 26 applied to bearing insert 5 in a force fit. The longitudinal axis of threaded shaft 25 is aligned in the direction of the longitudinal axis of bearing eye 3 designed as an elongated hole. The same elements are provided with the same reference numbers.

Although at least one embodiment of the present invention has been shown and described, it is apparent that many changes and modifications may be made thereunto without departing from the spirit and scope of the invention.

What is claimed is:

1. An adjustment device for the alignment of supporting parts pivotally accommodating guide rails of a freight loading system on a structure having inherent dimensional tolerances, comprising:
   a) a bearing eye shaped as an elongated hole having a cross sectional area;
   b) a supporting part comprising a bearing insert, wherein said bearing insert is aligned for adjustable motion in said bearing eye; and
   c) a bearing block, wherein said bearing block has at least two tensioning elements arranged on opposite sides of the bearing insert that bear on said bearing insert to adjustably move said bearing insert in a desired position;
   wherein the bearing insert is movable along a longitudinal axis with reference to the cross sectional area of the elongated hole; and
   wherein an initial tension is built up between the at least two tensioning elements.

2. The adjustment device according to claim 1, wherein:
   a) each tensioning element has a threaded shaft; and
   b) the bearing block has at least two threaded holes, wherein said each threaded hole is assigned to a threaded shaft.

3. The adjustment device according to claim 2, wherein each said tensioning element further comprises:
   a) a threaded part having said threaded shaft; and
   b) a clamping part in engagement with said bearing insert to facilitate rotary movement of said tensioning element.

4. The adjustment device according to claim 1, wherein at least one of said two tensioning elements is a spring that acts against the other tensioning element.

5. The adjustment device according to claim 1, wherein said bearing insert is designed as an axisymmetric bushing.

6. The adjustment device according to claim 1, wherein said bearing eye has guide surfaces that interact with the said bearing insert.

7. The adjustment device according to claim 6, wherein hole flanks of said elongated hole form said guide surfaces.

8. An aircraft with an adjustment device for the alignment of supporting parts pivotally accommodating guide rails of a freight loading system on a structure having inherent dimensional tolerances, comprising:
   a) a bearing eye shaped as an elongated hole having a cross sectional area;
   b) a supporting part comprising a bearing insert, wherein said bearing insert is aligned for adjustable motion in said bearing eye; and
   c) a bearing block, wherein said bearing block has at least two tensioning elements that bear on said bearing insert to adjustably move said bearing insert in a desired position;
   wherein the bearing insert is movable along a longitudinal axis with reference to the cross sectional area of the elongated hole; and
   wherein an initial tension is built up between the at least two tensioning elements.

* * * * *